United States Patent [19]
Williams

[11] Patent Number: 4,781,233
[45] Date of Patent: Nov. 1, 1988

[54] EXPANDABLE TIRE HUB APPARATUS

[76] Inventor: Roy L. Williams, 4716 Rye St., Metairie, La. 70002

[21] Appl. No.: 592,275

[22] Filed: Mar. 22, 1984

[51] Int. Cl.$^4$ .............................................. B60C 25/00
[52] U.S. Cl. ..................................... 157/16; 269/48.1
[58] Field of Search ............................. 157/14, 16, 21; 269/48.1; 279/2 R, 2 A; 73/485

[56] References Cited

U.S. PATENT DOCUMENTS

| | | | |
|---|---|---|---|
| 3,770,032 | 11/1973 | Stull | 157/16 |
| 3,770,287 | 11/1973 | Weber et al. | 269/48.1 X |
| 4,070,915 | 1/1978 | Caroff | 157/16 X |
| 4,184,664 | 1/1980 | Ouriet et al. | 269/48.1 X |

Primary Examiner—James G. Smith
Attorney, Agent, or Firm—Pravel, Gambrell, Hewitt, Kimball & Krieger

[57] ABSTRACT

An expandable tire hub apparatus having a hub member, a plurality of shoe members radially expandable from the hub member and a plurality of piston members interconnecting the hub member to each of the shoe members, the piston members responsive to fluid pressure on them, and including guide members interconnecting the shoe assemblies and the hub members for maintaining equal retraction and expansion of the hub members during the operation of the apparatus. The apparatus also includes a flexible belt member positioned around the circumference of each of the shoe assemblies sealingly engaging the bead of the tire when the shoe assemblies are in the expanded position. There is further provided a manner for injecting air into the interior of the tire while the tire is mounted on the expanded shoe assemblies.

4 Claims, 6 Drawing Sheets

EXPANDABLE TIRE HUB APPARATUS

BACKGROUND OF THE INVENTION

1. Field of the Invention

The present invention pertains to tire finishing equipment and the related arts. More specifically, the present invention provides an expandable tire hub suitable for use with present day tire finishing equipment including means for rotating the hub and performing operations in conjunction therewith.

2. General Background

The use of vehicles employing pneumatic tires has resulted in the development of the retreading industry as the carcass of a tire represents the significant cost thereof and it is often more economical to retread the tire than replace it in its entirety. For retreading tires, the retreading industry has developed many sophisticated and complex pieces of equipment and machinery to not only maximize production, but additionally to provide a more durable and safe product. Conversely, these engineering efforts have resulted in even greater use of retreads for all types and sizes of vehicles.

Perhaps the first major step in preparing a tire carcass to be retreaded is the buffing operation which requires that the outside peripheral surface of the tire be ground or buffed down. This is accomplished on a tire buffing machine comprising an inflated hub member upon which the tire is rotatably mounted. Upon rotation of the tire, the outside peripheral or treaded surface, that is, the surface which contacts the ground, is accordingly buffed down. Such tire finishing equipment would generally comprise a grinding wheel operably mounted upon the tire rotating machine and related appurtenances.

One of the major problems the retreading industry faces in the preprocessing of a tire carcass is to produce a product which is balanced as close as possible or is not very much out of round. Thus, the hub upon which a tire carcass is placed for buffing must be very accurate such that once a tire is placed thereon and it is expanded, and then the tire subsequently inflated, the tire will be concentrically mounted relative to the axis of rotation. Otherwise, the outer peripheral surface of the tire will be buffed such that it will not be concentric with the tire rim. Under such conditions, the subsequent retreading of the tire will produce a product which is out of balance. It is a well established fact in the retread arts that one of the major problems with retreads is due to the fact that they are difficult to balance caused by the above problem.

The more popular type of inflated hub employed in the art today comprises a semi-mechanical type of hub incorporating a central cone type member which is in sliding frictional contact with a series of vanes extending outward simulating a spoked tire. The individual vanes or spokes of the wheel in turn are connected to rim or hub portions and the centrally located cone member is generally actuated along its longitudinal axis so as to cause the vane members to move in and out radially. An expandable round rubber casing member is fixed over the segmented rim members. In operation, the hub is deflected whereby the cone member is withdrawn, a tire placed thereon, the cone member is shoved inwards so as to expand the segmented rim members out into contact with the beads or inside rim of the tire is then inflated by virtue of a source of pressurized air injected through the casing member. Typical of this type of hub is that as disclosed in U.S. Pat. Nos. 2,936,676 and 2,960,130.

Present-day expandable hubs still leave much to be desired in their performance, especially in light of the fact that the industry has been subjected to close scrutiny by the federal government to meet greater specifications for retreads. Typical disadvantages of these present-day expandable hubs are that due to their mechanical features whereby metal is in contact with metal at the greater points of stress, considerable wear is experienced. Conversely, these mechanical or semi-mechanical hubs require constant oiling which presents a problem due to the amount of grit and by-product rubber produced in the work zone. Additionally, by virtue of the mechanics of these prior art devices, they have limited expansion such that a single hub will only accommodate a narrow range of different sizes of tires. Needless to say, the different sizes of tires are virtually unlimited. Additionally, the frictional and wear problems encountered in these prior art hubs make it difficult to maintain a high degree of roundness accuracy as the wear increases due to the particular mechanical design. The problem is yet complicated by the fact that the type of wear is not a compensating wear such that the roundness would be maintained within a certain specification, but rater, continues to increase directly proportional to the wear.

The present invention clearly overcomes the above prior art problems and has for its objectives the provision of an expandable hub exhibiting such advantages and features as being air over hydraulics such that it does not experience a non-compensating wear problem by virtue of the fact that it has no metal to metal contact at its points of stress. Moreover, by virtue of the present device being hydraulic, it remains constantly oiled. Another very distinguishing feature is that for a given hub size, it has a much greater expansion factor whereby it can accommodate a much greater range of different tire sizes. The net result is a substantial savings to the retreader both in the initial cost of the hub as well as in increased production due to the fact that a worker need not change the hub as much during retreading operations. Of even more significance is the fact that it maintains its roundness accuracy throughout its life, which includes the capability of the present hub to compensate for wear. The above, together with other features and advantages of the instant invention, will become apparent to one skilled in the art in light of the details of construction and operation of the present expandable tire hub device as shown in the drawings and described in the ensuing detailed disclosure of its preferred embodiments as particularly pointed out in the appended claims.

Therefore, it is an object of the present invention to provide an improved expandable tire hub apparatus for accommodating a wide range of tire sizes;

It is a further object of the present invention to provide an expandable tire hub apparatus utilizing the concept, air over hydraulics;

It is a further object of the present invention to provide an expandable tire hub apparatus which assures the peripheral tire surface to be concentric with the tire rim;

It is still a further object of the present invention to provide an expandable tire hub for concentrically mounting a tire thereupon and simultaneously inflating the tire for workover.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein.

DETAILED DESCRIPTION OF THE PREFERRED EMBODIMENT

Figure 1:
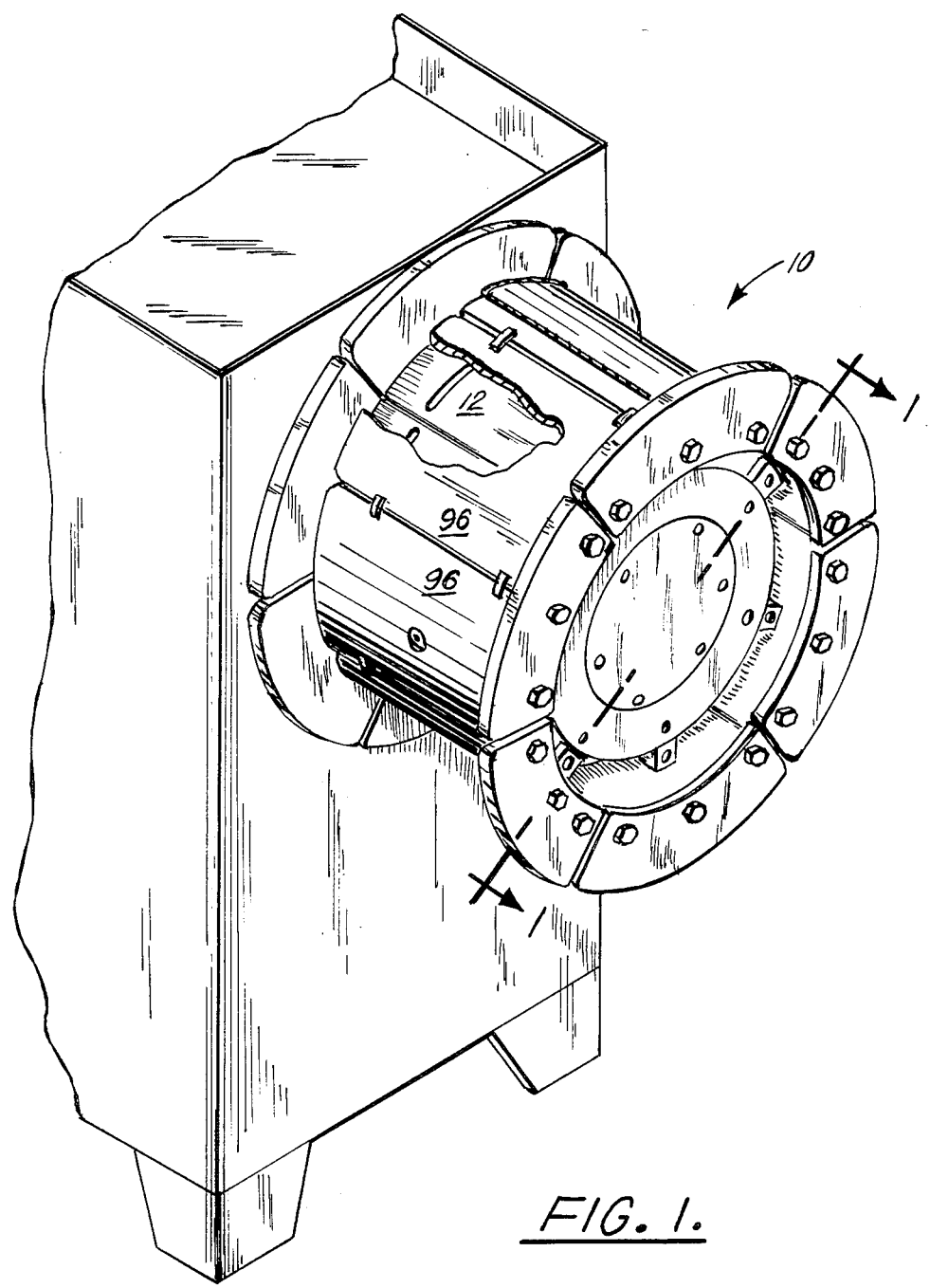
FIG. 1 is a partial cutaway perspective view of the preferred embodiment of the apparatus of the present invention.
Figure 2A:
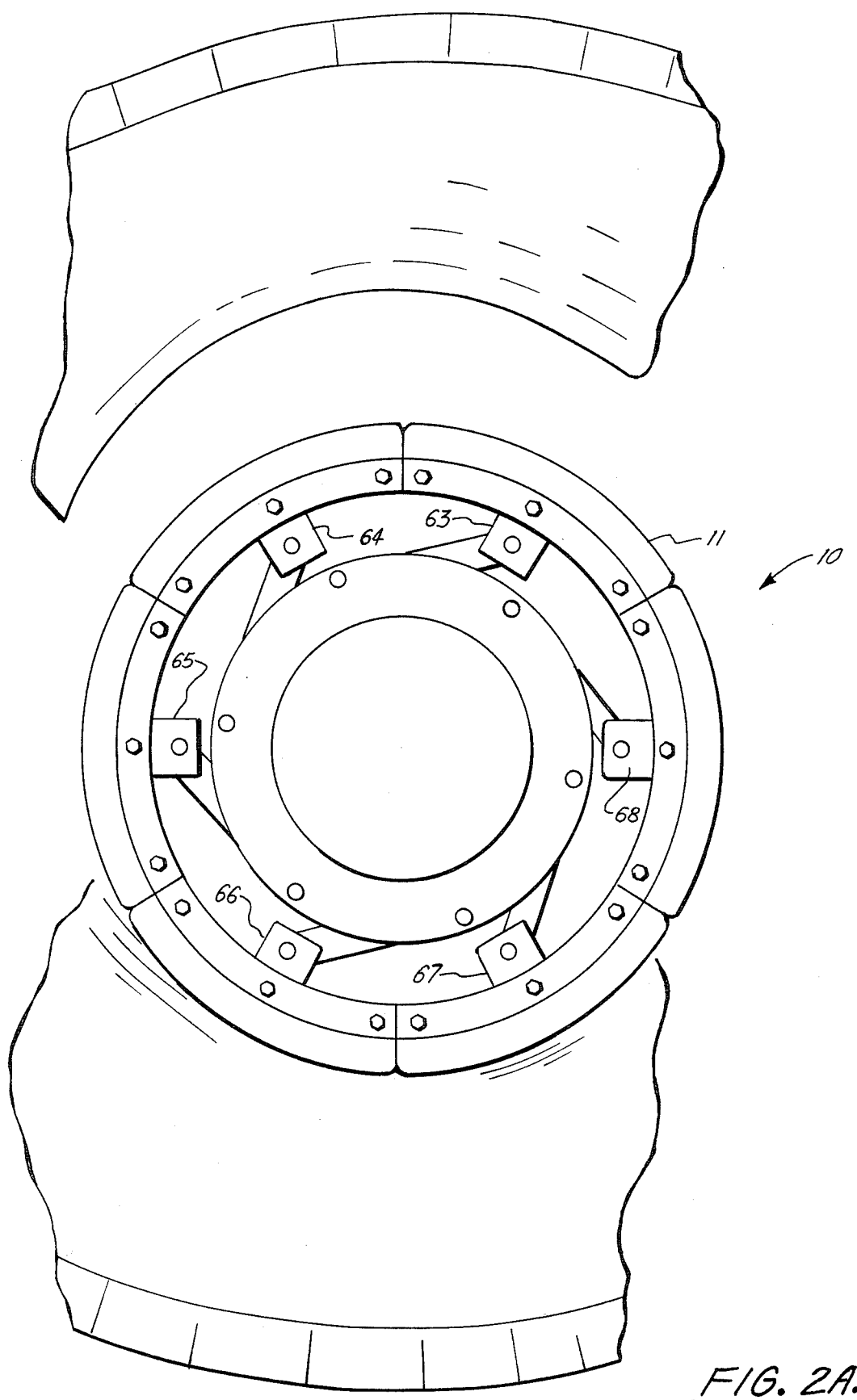
FIGS. 2A and 2B are front views of the preferred embodiment of the apparatus of the present invention illustrating the apparatus in the retracted and the expanded stages respectively.
Figure 2B:
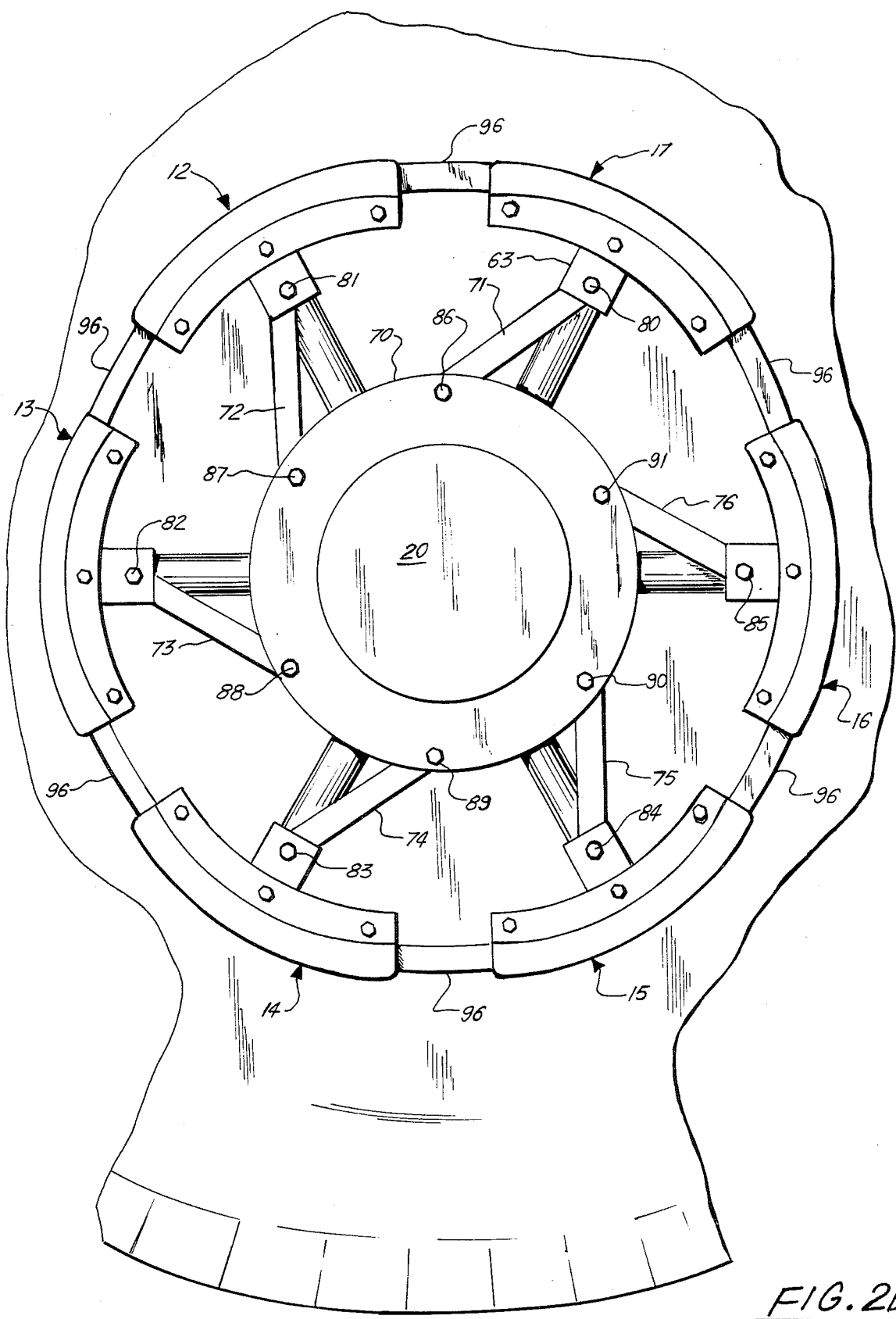

Referring to the front perspective and front views shown in FIGS. 1 AND 2A-2B of the drawings, the present expandable tire hub means 10 comprises the hub assembly 11 which in turn further comprises a plurality of arcuate shaped segments or shoes 12. Specifically, the embodiment of FIG. 1 comprises the six separate shoe member assemblies 12 through 17. The respective shoe assemblies 12 through 17 are radially mounted and positioned relative to each other so as to form the tire hub assembly 11, the details of which are further defined hereinafter.

The various hub portions or shoes 12 through 17 in their related or non-operating position contact or are in abutment with the outer peripheral surface of the dual piston and cylinder assembly 20, as seen in FIG. 2A. The various shoes 12 through 17 are operably attached to the dual piston and cylinder assembly 20 in the manner described below for movement into their operating position as seen in FIG. 2B.

Figure 3:
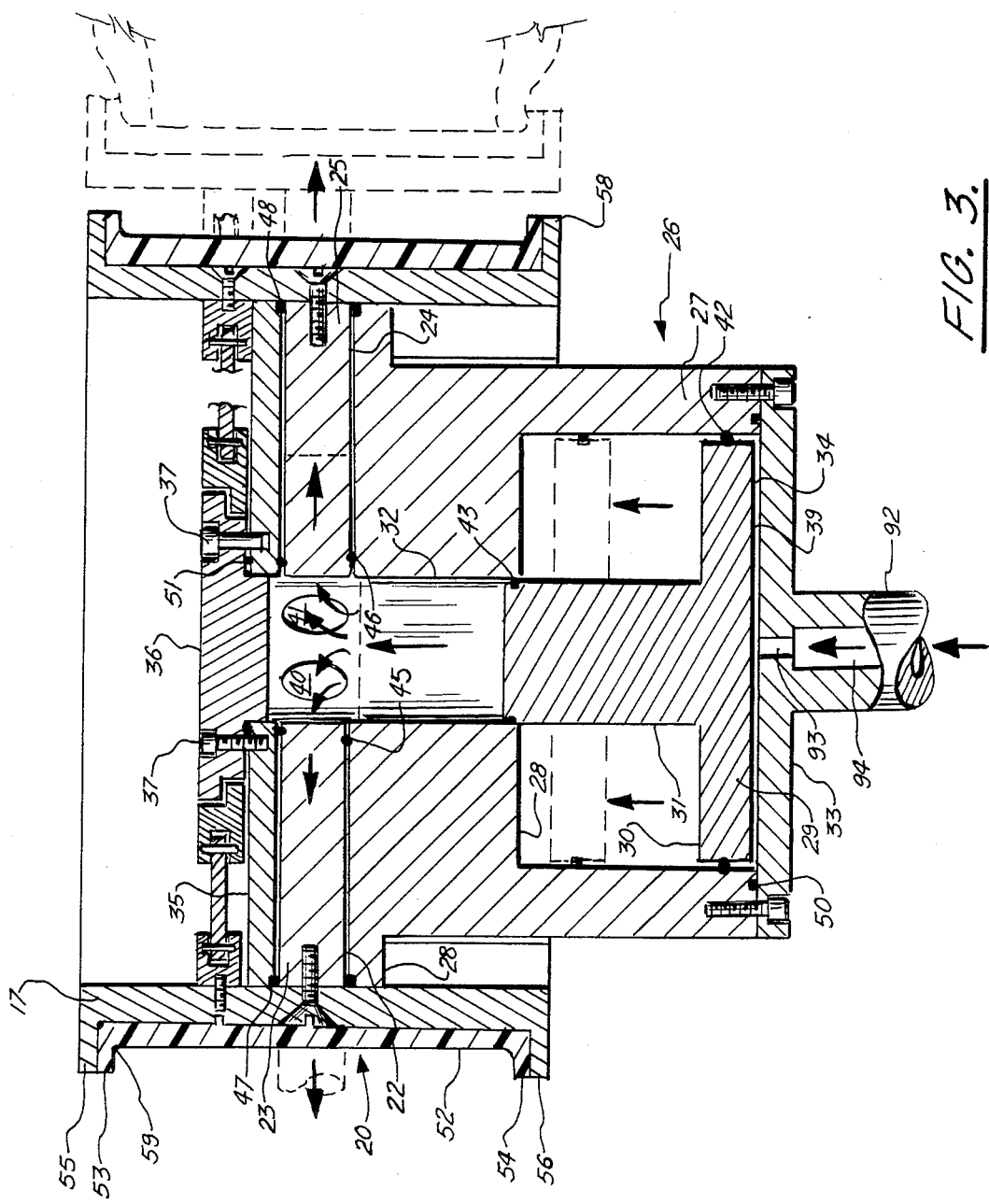
FIG. 3 is a cutaway side view of the air and hydraulic system of the apparatus of the present invention.

The assembly 20, referring additionally to FIG. 3 of the drawings, is further defined as comprising the radial piston and cylinder portion 21 which is provided with a number of hydraulic cylinders, a pair for each shoe member. For example, as shown in FIG. 3 which represents a cross-section taken along the line 1—1 of FIG. 1 of the present hub means 10, the radial piston and cylinder portion 21 is provided with the cylinder 22 to receive the piston member 23 of the shoe assembly 17. Correspondingly, the cylinder 24 is provided to receive the piston member 25 of the shoe assembly 14.

As further shown in FIG. 3 of the drawings, the dual piston and cylinder assembly 20 further comprises the master piston and cylinder portion 26 which in turn further comprises the extended cylindrical portion 27 which defines a cylinder chamber wherein the piston member 29 is operably positioned. One end of the cylinder portion 27 is attached to the backplate 28 of the radial piston and cylinder portion 21. The piston member 29 further comprises the round piston head portion 30 which is of a diameter slightly less than the inside diameter of the cylindrical extended portion 27 so as to define a conventional air-hydraulic piston and cylinder assembly. The piston member 29 further comprises the extended centrally located ram portion 31 which extends within the concentric centrally mounted extended cylindrical hub portion 32 which defines an inner cylinder and piston assembly in combination with the ram portion 31 of the piston 29. Ram portion 31 is likewise adapted and has an outside diameter so as to snuggly fit within the inside of the extended cylinder portion 32. Thus, the piston member 29 in combination with the outer piston cyclinder 27 and the inner piston cylinder 32 forms a dual acting piston assembly. The round piston head portion 30 is shaped on its front side so as to define the chamber 34 in combination with the outer cylinder portion 27 which is closed off by virtue of the cover plate means 33. Thus, even when the piston 29 is fully withdrawn or not subject to air pressure, that is, positioned as shown in FIG. 3, a sufficiently large enough air chamber is provided for immediate response to pressurized air injected into the chamber 34. The front plate portion 35 of the radial piston and cylinder portion 21 is provided with the cover plate member 36 which is operably attached to the front plate portion 35 by the bolt means 37. Likewise, the plate member 33 is operably attached to the cylinder portion 27 by virtue of the bolt member 38. The piston head portion 39 in combination with the piston cylinder portion 27 and the enclosure plate 33 define the air chamber 34 into which air is injected so as to move the piston member 29 in the direction of the arrows as shown in FIG. 3. Likewise, the ram portion 31 of the piston 29 in combination with the piston cylinder portion 32 and the hydraulic disc enclosure plate member 36 define the fluid chamber 39 which is acted upon by the piston member 29 upon injecting air into the chamber 34. A fluid contained within the chamber 39 upon being so compressed thereupon acts upon the piston portions of the various shoes 12 through 17, for example, upon the piston members 23 and 25 shown in section in FIG. 2, as well as upon the other similar pistons radiating outwards from the central hydraulic chamber 39. In the embodiment of FIG. 3, the shoe pistons for the pistons 15 and 16 are reposed within the cylinder openings 40 and 41, respectively.

As further shown in FIG. 3 of the drawings, the various piston members of the present invention are operably sealed within their respective cylinders by virtue of conventional o-ring seals. For example, the piston member 29 is provided with the o-ring seal means 42 which is fitted within a circumferential groove provided on the outer peripheral surface of the piston portion 30 of the piston member 29. The o-ring 42 is sized so as to provide a tight seal between the outer peripheral surface of the piston portion 30, that is, via the groove provided therein and the inside circumferential surface of the cylinder portion 27 of the dual piston and cylinder assembly 20. Similarly, the o-ring member 43 is provided at the innermost inside end of the cylinder portion 32 wherein the ram portion 31 of the piston 29 is operably fitted, the cylinder 32 being grooved along its inside peripheral surface to accept the o-ring member 43 which is sized to tightly seal the ram piston portion 31 relative to the inside surface of the cylinder portion 32.

The respective shoe piston members for the shoes 12 through 17 are similarly sealed wihin their respective cylinders by virtue of o-ring sealing means. For example, as shown in FIG. 3, the piston portion 23 of the shoe member 26 is provided with the o-ring member 45, the piston member 23 being grooved at its lowermost end portion to accept the o-ring 45 which seals it relative to the inside peripheral surface of the cylinder 22 in the conventional fashion. Likewise, the piston portion 25 of the shoe 14 is provided with the o-ring member 46 which functions in an identical manner. The respective radial piston and cylinder portion 21 cylinders, for example, the cylinders 22 and 24, are sealed from the atmosphere or surrounding environment, that is, to prevent the ingress of dirt into the cylinders, by virtue of a resilient dust or oil seal member, such as the seal member 47 which seals the cylinder 22 and the seal member 48 which seals the cylinder 24. These members can be any conventional type of chevron shaped resilient seal or the like, as long as they are capable of preventing dirt and other contaminants from entering the respective piston cylinder.

The end plate member 33 is likewise sealed to the cylinder portion 27 of the master piston and cylinder portion 26 by virtue of some suitable sealing means such as the o-ring 50. Moreover, the hydraulic disc cover plate member 36 is also sealed to the front plate portion 35 of the assembly 21 by virtue of the o-ring member 51.

The various hydraulic shoe assemblies 12 through 17 are contained within and covered by the flexible belt member 52 which is a resilient member which in effect urges the various shoes inward at all times and for that reason, is made of some resilient material such as rubber. The flexible belt member 52 is provided with the respective up raised edge portions 53 and 54 so as to mate with and form a sealing relationship with the bead of a conventional vehicle tire which is placed upon the flexible belt member 52 which when expanded into contact with the tire into which air is injected, thereby forms a conventional wheel and rim assembly. Each of the respective shoes 12 through 17 are likewise provided with the up raised flanged portions 55 and 56 as in the case of the shoe means 17 shown in FIG. 3 of the drawings to thereby define a cavity into which the up raised portions 53 and 54 of the flexible belt means 52 fit and are retained therein upon contact with a tire placed thereon. The shoe means 14 is likewise provided with the raised portions 57 and 58 which contact and restrain the flanged portion 53 and 54 of the flexible belt means 52.

As shown in FIG. 3, the cover plate means 33 further comprises the extended air inlet and outlet shaft portion 92 which comprises an elongated cylindrical hollow shaft in open communication with the chamber 34 via the aperture 93. A source of compressed air is connected to the shaft 92 and upon flowing through the conduit 94, enters the chamber 34 which thereupon forces the piston means 29 in the direction of the arrow. The piston ram portion 31 is accordingly forced into the chamber 39 and compresses a source of hydraulic fluid therein which in turn acts upon the various shoe pistons to correspondingly force them radially outwards. The rubber rim member 52 is thus caused to expand equally over the shoe surfaces.

Figure 7:
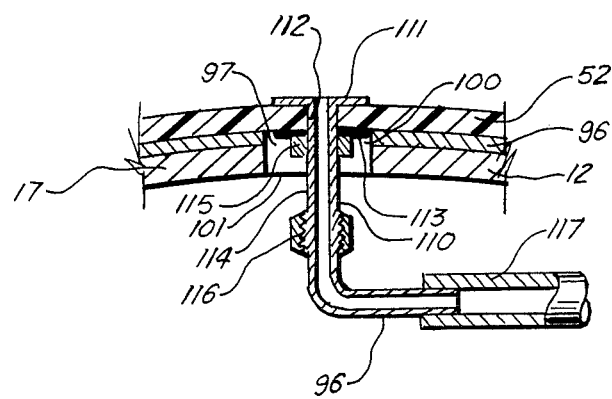
FIG. 7 is a cutaway side view of the mounting of the air conduit of the present invention.

As illustrated in FIG. 2B, when the shoe members are expanded radially outwards, there exists a gap between the lateral edges of the shoes, e.g., the gap 95 shown between the shoes 12 and 17. As the bottom portion of the U-shaped rim must be continuous as in a conventional tire rim in order to entrap air in a tire placed thereon, the void plates 96 are provided to span the gap 95 and support the web 52 over an arcuate path so as to provide a continuous arcuate tire rim surface to support the tire sealing belt 52. In the illustration of FIG. 7, the aperture 97 centrally provided in the void plate 96 is shown in combination with the compressed air inlet conduit 98 through which air is injected into a tire placed upon the rim. FIG. 7 discussed below shows specifically how the compressed air source is operably attached to the web 52. The edges of two adjacent shoes, e.g. 12 and 17, are provided with the indentures or grooves 100 and 101 to accommodate the flanged connector assembly 110, washer 113, and nut 115 of the compressed air source.

Referring to FIG. 7, the air conduit 98 is operably attached to the web 52 via the flanged connector assembly 110 which comprises the flanged member 111 which bayonets through the aperture 112 provided in the belt 52. The washer 113 fits over the shank portion 114 to serve as a solid base for the nut 115 which screws upon the lower part of the shank portion 114. Upon tightening the nut 115, an effective air tight connection is made to the web 52. The conduit portion 98 is connected at one end to the flanged member 111 via the swivel means 116 and its other end to the flexible air hose 117. The hose 117 is in turn connected to an air outlet connection (not shown) on shaft 92 to provide for simultaneous actuation of master piston and assembly portion 26 and inflation of a two mounted on hub assembly 11.

Figure 4A:
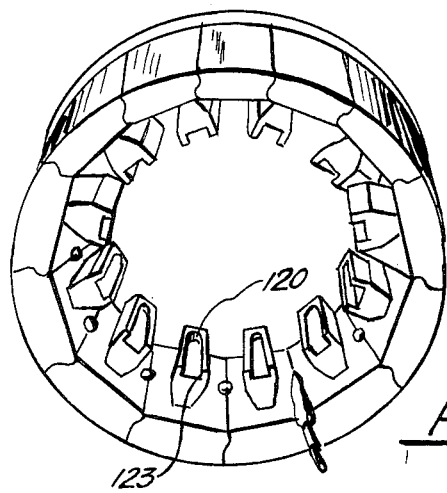
FIGS. 4A and 4B are perspective views of the interior features of the preferred embodiment of the present invention.
Figure 4B:
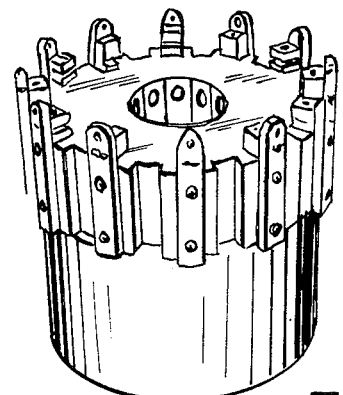

FIGS. 4A and 4B illustrate the internal features of the apparatus 10 as they would appear utilizing a greater number of shoes. FIG. 5 illustrates a center line sectional view showing how the belt 52 is operably positioned upon the assembly hub shoes 12 through 17 which in turn are operably connected to form a continuous circumferential hub surface by the series of void plates 96. As brought out above, each of the void plates 96 is provided with the centrally located aperture 97 which in turn receives the belt extension 102 (five being provided over its inside circumferential surface, the sixth remaining void plate receiving the air inlet and outlet conduit 98). In such fashion, the belt 52 is prevented from creeping or moving over the hub surface to thereby prevent the lateral displacement of the air conduit 98, that is, to prevent it from shifting from one side to the other.

As shown in FIG. 3 and brought out above, the belt 52 is provided with the raised edges 53 and 54, the inside of which curve down and inwards, e.g., the radius 59, so as to provide a cupped surface to accommodate the bead of a tire placed thereon. Upon expanding the belt 52, the raised edges 53 and 54 move inwards, however, upon their contact with the tire bead with which they quickly seal due to the curved radial surface 59, the expanding tire thereupon shoves the portions 53 and 54 outwards into contact with the shoes flanges 55 and 56. This relationship provides for a much more efficiently operating belt 52 as compared to prior art devices employing an expandable band 52.

Figure 6:
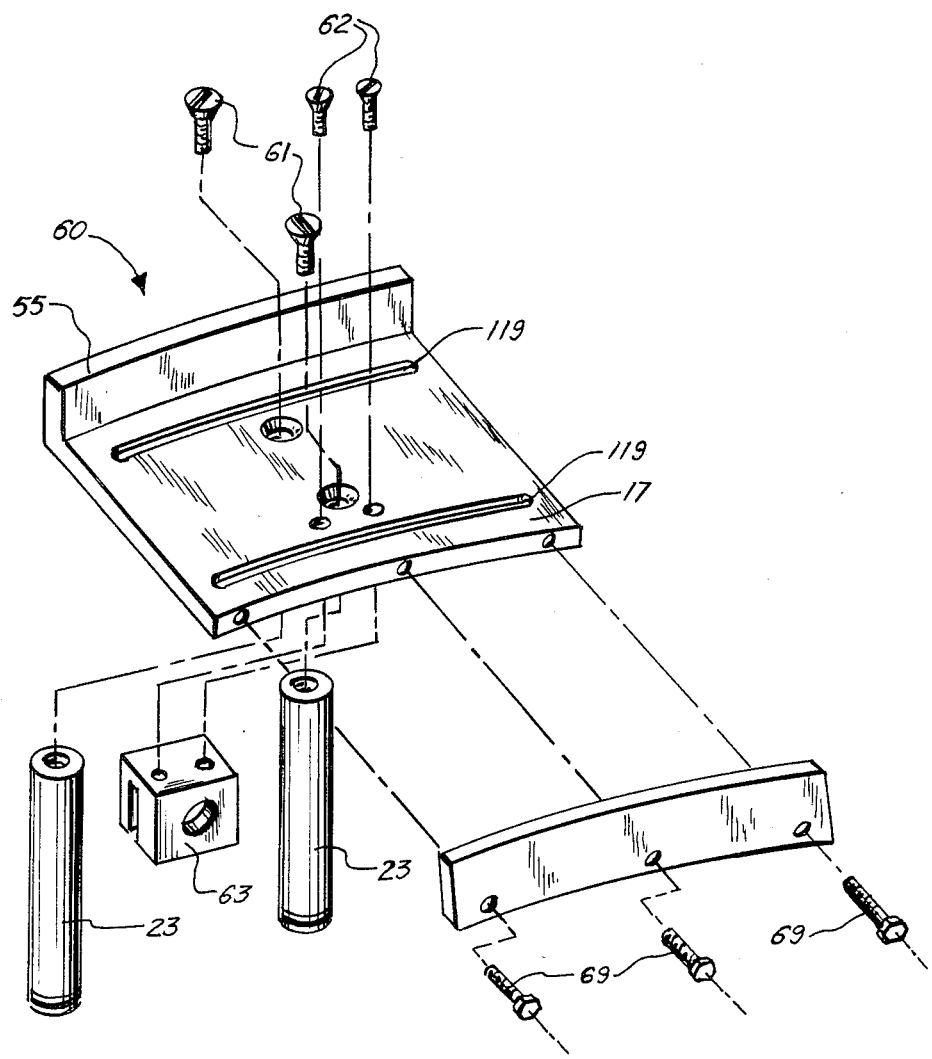
FIG. 6 is an exploded view of the hub plate of the preferred embodiment of the apparatus of the present invention.

As shown in FIG. 6, the various shoe assemblies 12 through 17 are further defined as comprising an arcuately shaped hub shoe member and corresponding piston supports and actuating member operably affixed thereto. For example, the shoe 17 shown in FIG. 2 comprises the hub shoe member 60 shown in FIG. 6 of the drawings. Flanged edge portions 55 and 56 are attached to shoe 17 by screws 69. The member 60 is provided with the flanged edge portions 55 and 56 which function as described above. The member 60 is preferably constructed of aluminum and the piston 23 of aluminum or brass which are bolted to shoe 17 by virtue of counter-sunk screws 61. The shoe assembly 17 (as all shoe assemblies) further comprises the control arm yoke member or control arm shoe pivot 63 which is bolted to the shoe plate 60 by virtue of the counter-sunk screws 62. The latter functions in the manner described below. The remaining shoe assemblies 12 through 16 are similarly provided with the yokes 64 through 68, respectively. Of course, the above separate components of the shoe assembly 12 could be made integral with the shoe plate 60, that is, cast with the plate 60 in one operation. Grooves 119 in shoe member 17, as in all shoe members, interact with raised edges (not shown) on the lower portion of void plates 96 to serve as a guide so that void plates 96 remain in the proper position and without binding while sliding on shoe members 12–17 when apparatus 10 is activated into it's operating and non-operating positions.

The respective shoe assemblies 12 through 17 are operably connected to the central control disc 70 through the respective control arm segments or connectors 71 through 76 which serve to automatically control their position equidistant from the longitudinal axis of the radial piston and cylinder portion 21 at all times. Otherwise, the shoe assemblies being hydraulically actuated, they may or may not extend equally outwards upon actuation. The net result would be that the hub assembly 11 would not be concentric relative to the longitudinal axis of the present device which is crucial and which represents an inherent vice in present-day devices which perform the same function in a mechanical manner, that is, by an air actuated central cone shaped member which expands the shoes. As brought out above, a very distinguishing advantage and feature of the present expandable hub is the fact that the amount of wear in the hub actuation components is greatly decreased, coupled with the fact that the wear factors are equalized such that any wear in the components is compensated for.

The control arms 71 through 76 are pivotally attached on one end to the respective yoke members 63 through 68 by virtue of the yoke pins 80 through 85 and at their other ends to the control disc or ring 70 by virtue of the disc pins 86 through 91. By such an arrangement, the control arms 71 through 76 all move in unison such that any attempt by one of the hub shoes to move radially outwards to a greater extent than any of the others will cause its control arm to pull upon the control disc 70 which in turn will exert a simultaneous equal pull upon the other control arms which in turn will shove the other shoes outward equally. This same operational functional relationship applies upon retraction of the shoes.

FIGS. 4 and 5 illustrate a particularly preferred embodiment of the present invention whereby the various shoe assemblies can be replaced to install different sizes of shoes to accommodate different tire sizes. As brought out above, a distinct advantage and feature of the present invention is the fact that for a given size of the present hub, a larger range of tire sizes can be accommodated than in the case of prior art devices. However, when combining the feature of making the shoes removable, an even greater degree of versatility is realized in the range of tire sizes and types accommodated by the present unique hub design incorporating air over hydraulics as a distinct design element.

Figure 5A:
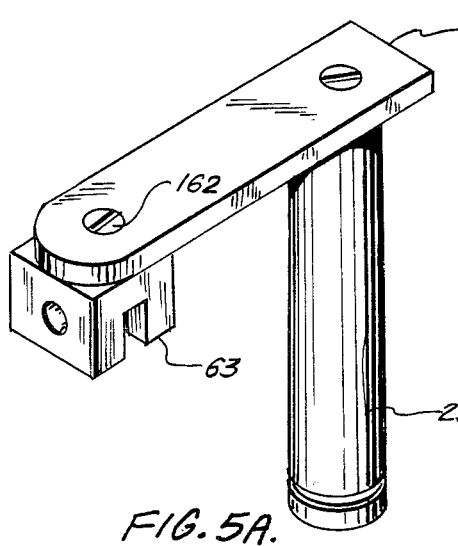
FIGS. 5A through 5D are partial side and perspective views of the interior features of the apparatus of the present invention.
Figure 5B:
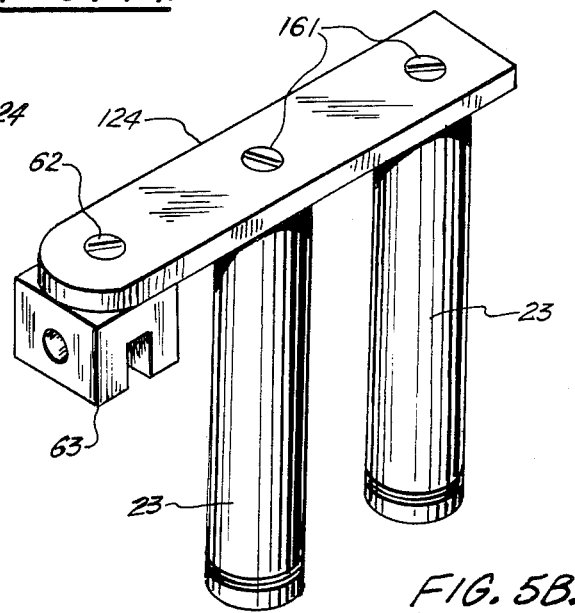
Figure 5C:
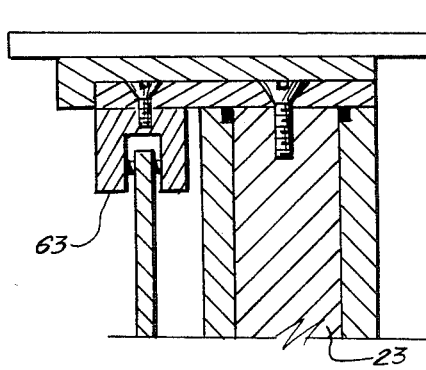
Figure 5D:
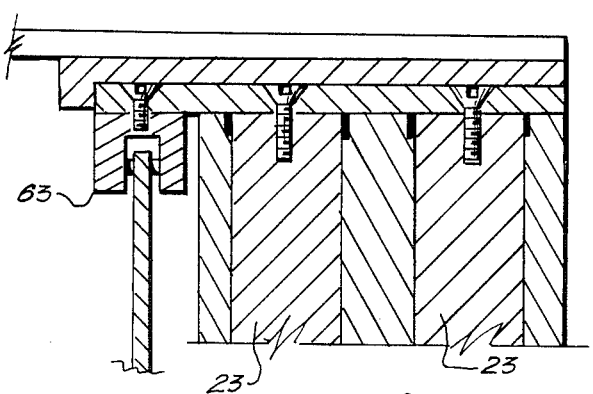

Taking the shoe 12 in a fully expanded or extended position as an example and referring to FIG. 5C, D which represents a cross-sectional view taken along a radial side elevation of FIGS. 5A, B, the shoe plate 17 thereof is bolted to the slide block or raceway 120 by virtue of the counter-sunk screws 161 and 162. The slide block 120 is provided with the inclined or beveled interior groove 123 as seen in FIG. 4A. The slide bar or tongue member 124 fits therein and is beveled to fit snugly within the groove 123 so as to form a common tongue and groove structure. The slide bar 124 is affixed to its respective mating piston member 23 by virtue of the counter-sunk screw 161. Moreover, the slide bar 124 is also attached to its respective yoke member 63 by virtue of the counter-sunk screw 162. The counter-sunk screws 161 and 162 serve the same function as in the earlier described embodiment of FIG. 1 wherein the shoe member 60 is attached directly to the piston 23 and yoke 63.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An expandable tire hub apparatus, comprising:
   a. a hub assembly;
   b. a plurality of shoe members radially expandable from said hub assembly;
   c. a plurality of first piston means interconnecting said hub assembly and each of said shoe members, said plurality of first piston means responsive to fluid pressure;
   d. a second piston member responsive to fluid pressure within said hub assembly so that movement of said second piston member imparts fluid pressure to each of said plurality of first piston means for radially expanding each of said shoe members into air tight engagement with a tire positioned on said hub assembly; and
   e. guide means, interconnecting said shoe members and said hub assembly, so that when pressure is applied to said plurality of first piston means each of said shoe members are maintained equidistant apart from said hub assembly as said shoe members move into air tight engagement with said tire positioned thereupon.

2. The apparatus in claim 1, wherein each of said shoe members are expanded outwardly by at least a pair of piston members.

3. The apparatus in claim 1, wherein said first piston means are movable through the use of hydraulic fluid pressure.

4. The apparatus in claim 1, wherein said second piston means is movable through the use of air pressure.

* * * * *